United States Patent
Sherrer et al.

(10) Patent No.: US 7,345,316 B2
(45) Date of Patent: Mar. 18, 2008

(54) WAFER LEVEL PACKAGING FOR OPTOELECTRONIC DEVICES

(75) Inventors: David W. Sherrer, Blacksburg, VA (US); Mindaugus F. Dautargas, Blacksburg, VA (US); Neil Ricks, Blacksburg, VA (US); Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 1105 days.

(21) Appl. No.: 09/999,517

(22) Filed: Oct. 24, 2001

(65) Prior Publication Data

US 2004/0264866 A1    Dec. 30, 2004

Related U.S. Application Data

(60) Provisional application No. 60/243,172, filed on Oct. 25, 2000.

(51) Int. Cl.
H01L 29/22    (2006.01)
H01L 29/227   (2006.01)
H01L 33/00    (2006.01)

(52) U.S. Cl. .......................... 257/98; 257/432; 385/65; 385/88; 385/92

(58) Field of Classification Search ................ 257/678, 257/684, 686, 687, 704, 707, 710, 98–99, 257/690, 698, 729, 79, 432, 435, E31.127; 385/53–94, 49
See application file for complete search history.

(56) References Cited

U.S. PATENT DOCUMENTS

| | | | |
|---|---|---|---|
| 3,404,215 A | 10/1968 | Burks et al. | |
| 3,768,991 A | 10/1973 | Rogers | |
| 3,874,549 A | 4/1975 | Hascoe | |
| 4,038,157 A | 7/1977 | Kim et al. | |
| 4,065,203 A | 12/1977 | Goell et al. | |
| 4,199,222 A | 4/1980 | Ikushima et al. | |
| 4,270,134 A | 5/1981 | Takeda et al. | |
| 4,611,884 A | 9/1986 | Roberts | |
| 4,639,074 A * | 1/1987 | Murphy | 385/49 |
| 4,725,114 A * | 2/1988 | Murphy | 385/59 |
| 4,791,075 A | 12/1988 | Lin | |
| 4,802,952 A | 2/1989 | Kobori et al. | |
| 4,818,058 A | 4/1989 | Bonanni | |
| 4,826,272 A | 5/1989 | Pimpinella et al. | |
| 4,897,711 A | 1/1990 | Blonder et al. | |
| 4,904,036 A | 2/1990 | Blonder | |
| 4,907,065 A | 3/1990 | Sahakian | |

(Continued)

Primary Examiner—Zandra V. Smith
Assistant Examiner—Thanh Y. Tran
(74) Attorney, Agent, or Firm—Jonathan D. Baskin

(57) ABSTRACT

An optical device package includes a substrate having an upper surface, a distal end, a proximal end, and distal and proximal longitudinally extending notches co-linearly aligned with each other. A structure is mounted to the substrate and has at least one recessed portion. The structure can be a lid or a frame to which a lid is bonded. An optical fiber is positioned within at least one of the proximal longitudinally extending notch and the distal longitudinally extending notch and within the recessed portion of the structure mounted to the substrate. The optical device package can also include conductive legs extending upwardly from bonding pads on the upper surface of the substrate to facilitate flip mounting of the optical device package onto a circuit board or other such platform.

22 Claims, 12 Drawing Sheets

U.S. PATENT DOCUMENTS

| | | | |
|---|---|---|---|
| 5,071,213 A | 12/1991 | Chan | |
| 5,291,572 A | 3/1994 | Blonder et al. | |
| 5,323,051 A | 6/1994 | Adams et al. | |
| 5,384,872 A | 1/1995 | Jacobs-Cook et al. | |
| 5,412,748 A | 5/1995 | Furuyama et al. | |
| 5,436,996 A * | 7/1995 | Tabasky et al. | 385/89 |
| 5,448,014 A | 9/1995 | Kong et al. | |
| 5,454,055 A | 9/1995 | Kragl et al. | |
| 5,475,778 A | 12/1995 | Webb | |
| 5,497,027 A | 3/1996 | Crafts | |
| 5,504,372 A | 4/1996 | Braden et al. | |
| 5,550,398 A | 8/1996 | Kocian et al. | |
| 5,557,695 A | 9/1996 | Yamane et al. | |
| 5,562,837 A | 10/1996 | De Givry | |
| 5,604,160 A | 2/1997 | Warfield | |
| 5,625,733 A | 4/1997 | Frigo et al. | |
| 5,631,502 A | 5/1997 | Shimada | |
| 5,635,761 A | 6/1997 | Cao et al. | |
| 5,647,042 A * | 7/1997 | Ochiai et al. | 385/56 |
| 5,656,552 A | 8/1997 | Hudak et al. | |
| 5,671,315 A | 9/1997 | Tabuchi et al. | |
| 5,699,073 A | 12/1997 | Lebby et al. | |
| 5,727,104 A * | 3/1998 | Sasaki et al. | 385/92 |
| 5,734,555 A | 3/1998 | McMahon | |
| 5,747,870 A | 5/1998 | Pedder | |
| 5,748,822 A * | 5/1998 | Miura et al. | 385/90 |
| 5,774,614 A | 6/1998 | Gilliand et al. | |
| 5,784,780 A | 7/1998 | Loo | |
| 5,798,557 A | 8/1998 | Salatino et al. | |
| 5,812,571 A | 9/1998 | Peters | |
| 5,818,404 A | 10/1998 | Lebby et al. | |
| 5,818,699 A | 10/1998 | Fukuoka | |
| 5,915,168 A | 6/1999 | Salatino et al. | |
| 5,917,976 A | 6/1999 | Yamaguchi | |
| 5,933,558 A | 8/1999 | Sauvageau et al. | |
| 5,949,654 A | 9/1999 | Fukuoka | |
| 5,960,141 A | 9/1999 | Sasaki et al. | |
| 5,966,488 A * | 10/1999 | Miura et al. | 385/93 |
| 6,056,448 A | 5/2000 | Sauter et al. | |
| 6,061,228 A | 5/2000 | Palmer et al. | |
| 6,074,104 A | 6/2000 | Higashikawa | |
| 6,106,735 A | 8/2000 | Kurle et al. | |
| 6,112,002 A * | 8/2000 | Tabuchi | 385/50 |
| 6,130,444 A * | 10/2000 | Hashizume et al. | 257/81 |
| 6,130,979 A | 10/2000 | Isaksson et al. | |
| 6,165,885 A | 12/2000 | Gaynes et al. | |
| 6,207,950 B1 | 3/2001 | Verdiell | |
| 6,221,753 B1 | 4/2001 | Seyyedy | |
| 6,222,967 B1 | 4/2001 | Amano et al. | |
| 6,228,675 B1 | 5/2001 | Ruby et al. | |
| 6,293,711 B1 * | 9/2001 | Sasaki | 385/88 |
| 6,309,113 B1 * | 10/2001 | Naito | 385/88 |
| 6,318,909 B1 | 11/2001 | Giboney et al. | |
| 6,318,910 B1 | 11/2001 | Higashikawa | |
| 6,326,680 B1 * | 12/2001 | Steijer et al. | 257/676 |
| 6,376,280 B1 | 4/2002 | Ruby et al. | |
| 6,377,742 B1 | 4/2002 | Go | |
| 6,400,009 B1 * | 6/2002 | Bishop et al. | 257/704 |
| 6,441,481 B1 | 8/2002 | Karpman | |
| 6,452,238 B1 | 9/2002 | Orcutt et al. | |
| 6,513,993 B1 * | 2/2003 | Nakanishi et al. | 385/92 |
| 6,521,989 B2 * | 2/2003 | Zhou | 257/698 |
| 6,611,001 B2 | 8/2003 | Cappuzzo et al. | |
| 6,632,027 B1 * | 10/2003 | Yoshida et al. | 385/88 |
| 6,635,866 B2 | 10/2003 | Chan et al. | |
| 6,680,491 B2 | 1/2004 | Nakanishi et al. | |
| 6,786,654 B2 * | 9/2004 | Kilian | 385/94 |
| 2001/0022382 A1 | 9/2001 | Shook | |
| 2002/0090749 A1 | 7/2002 | Simmons | |
| 2002/0113296 A1 | 8/2002 | Cho et al. | |
| 2003/0071283 A1 | 4/2003 | Heschel | |
| 2003/0081914 A1 | 5/2003 | Steinberg et al. | |
| 2003/0095759 A1 | 5/2003 | Dautartas et al. | |
| 2003/0123816 A1 | 7/2003 | Steinberg et al. | |
| 2004/0012083 A1 | 1/2004 | Farrell et al. | |

\* cited by examiner

WAFER LEVEL PACKAGING FOR OPTOELECTRONIC DEVICES

CROSS REFERENCE TO RELATED APPLICATIONS

The present application claims priority to U.S. provisional application Ser. No. 60/243,172, filed Oct. 25, 2000.

BACKGROUND

1. Technical Field

The present disclosure relates to an optoelectronic device package and to a method for making same.

2. Background of the Art

Various optical devices are known in the art and include such semiconductor devices as light emitting diodes (LEDs), laser diodes, and photodetectors. Optical semiconductors, e.g., optoelectronic devices, effect a conversion between optical signals and electronic signals.

Optical semiconductor devices are sensitive to environmental conditions and are generally sealed in hermetic packages or in plastic molding to prevent degradation caused by atmospheric contaminants such as humidity, dust, and free ions. The optical input/output surfaces of the components operatively coupled in a package are especially susceptible to contamination, hence, the desirability of hermetically sealing the package to prevent contact with the outside atmosphere. Hermetic sealing typically involves mounting a cap to a substrate having an optical semiconductor device by means of soldering, welding, and the like.

One problem associated with conventional optical device packages is the expense of their manufacture. It would be advantageous to provide an easier and cheaper method of making the device packages.

Another problem associated with conventional optical device packages relates to the mounting of the device package to a circuit board or other platform.

In one type of surface mounting technology the bottom surface of a semiconductor device is attached to the top surface of the package substrate. Electrical connections are made between the bonding pads on the top surface of the semiconductor device and the contacts on the mounting surface. The electrical connections are typically made by bonding thin gold or gold alloy wire from the device bonding pads to the electrical connections on the surface. The substrate of the ball grid array package has solder balls on its bottom surface opposite the semiconductor device. Disposed in a grid array, the solder balls are used to make contact with a circuit board. Inside the package are conductive traces which electrically connect the solder balls to the contacts on the top surface of the substrate where the semiconductor device is attached.

However, this method has disadvantages. Wire bonds have high parasitic inductance and are poor conductors of high speed signals, they are labor intensive to manufacture, and are not mechanically robust.

Another mounting method employs a flip-chip. A flip-chip has spaced apart bonding pads disposed on the top surface of the chip rather than just at the periphery. A corresponding array of solder mounting bumps is disposed on the top surface of the substrate onto which the chip is to be mounted. However, the array of bonding pads on the flip-chip and the array of bonding pads on the mounting surface are mirror images of each other. The chip is flipped over so that the individual solder bumps on the chip contact the corresponding solder bumps on the surface of the substrate. The flip-chip is then secured to the surface of the substrate by fusing the solder contacts. By eliminating the wire bonds and directly mounting to a substrate a flip-chip reduces the inductance between the semiconductor device and the substrate. Since the flip-chips have bonding pads arrayed on the entire top surface of the semiconductor device it can have far more bonding pads than a wire bonded chip.

While flip-chip technology is known for mounting semiconductor chips to the surface of a substrate within a package, there is yet need for an optoelectronic device package which can be flip-chip mounted to a circuit board or other mounting platform.

SUMMARY

An optical device package is provided herein which includes a substrate having an upper surface, a distal end, a proximal end, and at least one longitudinally extending notch; a frame mounted to the substrate the frame including a band-like member surrounding an open area and having at least one recessed portion; and, at least one optical fiber positioned within the at least one longitudinally extending notch and disposed through the recessed portion of the frame. An optical semiconductor component can be included in the optical device package. A lid can be mounted to the substrate for enclosing the optical semiconductor component in the interior space.

In another embodiment the optical device package can include a substrate having an upper surface, a distal end, and a proximal end, and at least a first longitudinally extending notch having a proximal end; and at least one longitudinally oriented optical fiber mounted to the substrate and having a proximal end spaced apart from the proximal end of the notch. The proximal end of the optical fiber can be distal to the proximal end of the first longitudinally oriented notch. Moreover, the substrate can include a second longitudinally extending notch co-linear with and proximal to the first longitudinally extending notch, wherein the first and second longitudinally extending notches are separated by a groove extending laterally across the substrate, and wherein the proximal end of the optical fiber extends over the lateral groove. The optical device package can further include a lid for enclosing the optical semiconductor component in an interior space, the lid being mounted to an upper surface of the frame. The lid has a proximal end which can be distal to the proximal end of the optical fiber.

In yet another embodiment the optical device package can include a substrate having an upper surface and a longitudinally extending notch; an optical fiber disposed within the longitudinally extending notch of the substrate; a lid for enclosing an interior space, the lid being bonded to the substrate and having a top surface; at least one electrical lead for conducting electrical signals between the interior space and at least one bonding pad positioned on an upper surface of the substrate; and, at least one conductive leg mounted to the bonding pad, the leg being sufficiently high to enable the optical device package to be flip mounted to a platform surface.

BRIEF DESCRIPTION OF THE DRAWINGS

Various embodiments are described below with reference to the drawings wherein.

DETAILED DESCRIPTION OF PREFERRED EMBODIMENT(S)

Figure 1A:
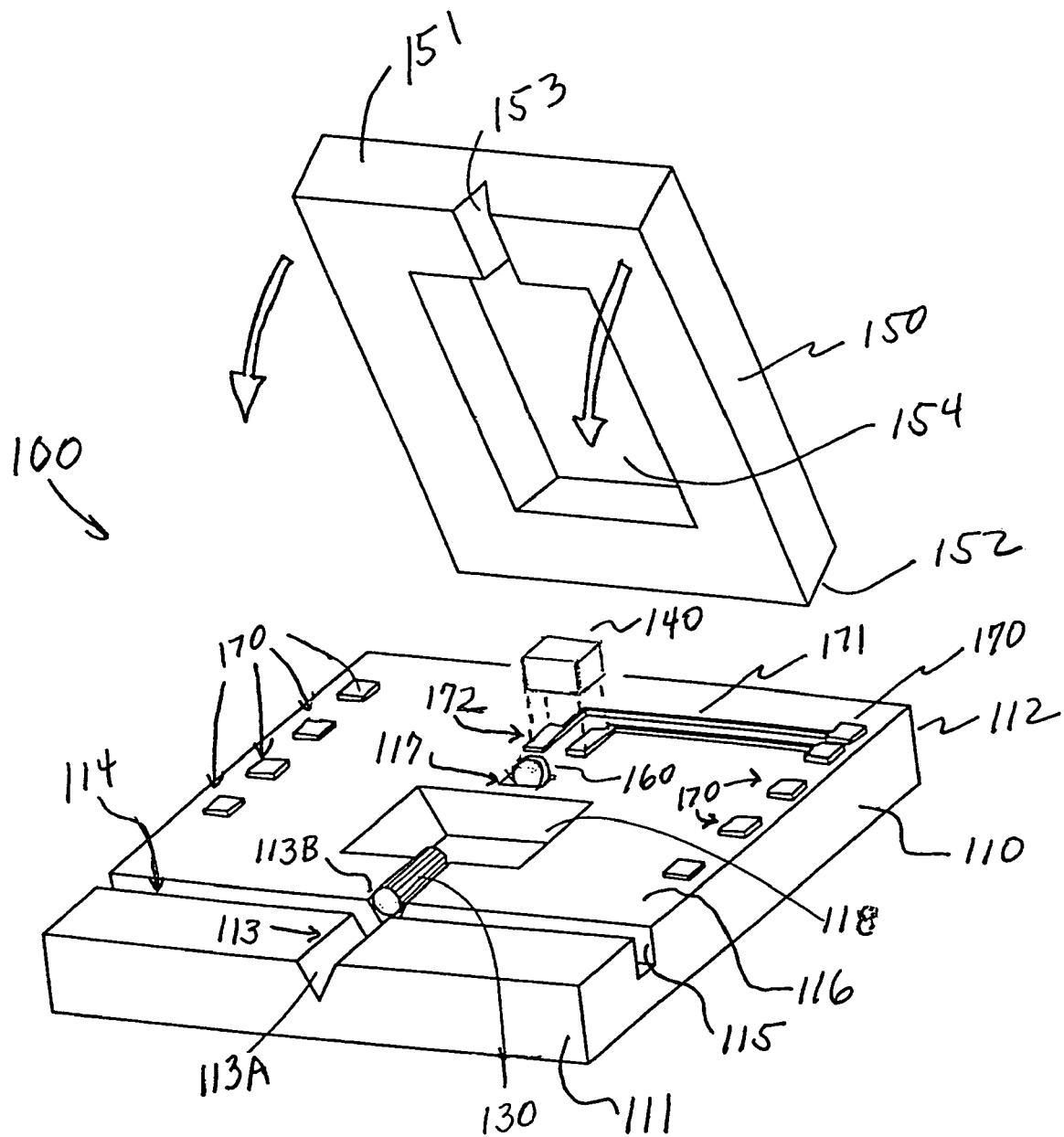
FIG. 1A is an exploded perspective view of an optical device package in accordance with the present description.

Referring now to FIG. 1A, an optical device package 100 includes a substrate 110, an optical signal carrier such as optical fiber 130, optionally an optical semiconductor component 140 with or without a lens 160, and a lid 150. Optical fiber 130 is typically a relatively short stub having a length generally ranging from about 1 mm to about 5 mm.

More particularly, substrate 110 can be any material suitable for providing an optical bench. A preferred material for fabricating substrate 110 is silicon. Other suitable materials include ceramic, polymers, and metal. Substrate 110 has a proximal end 111, a distal end 112, and a horizontal upper major surface 116. Substrate 110 can be formed by etching and/or cutting or other suitable method to provide a reception means, i.e., longitudinally extending notch 113 for an optical signal carrier extending longitudinally for receiving the optical fiber 130, and optionally a lateral groove 114. The lateral groove 114 can be formed by cutting the upper surface 116 with a dicing saw and is at least partially defined by proximal facing surface 115. The notch 113 is divided by the lateral groove 114 to form two separate notches, i.e., co-linear proximal notch 113A and distal notch 113B. The proximal end of proximal notch 113A is coterminous with the proximal end 111 of the substrate. The notch 113 can have a V-shaped cross section and is typically referred to as a "V-groove," although other cross sectional configurations such as U-shaped cross sections (semicircular, square, rectangular, etc.) are also contemplated.

Preferably, substrate 110 is single crystal silicon with the upper major surface 116 being in the (100) crystallographic plane. The upper surface 116 can be masked and selectively etched to form angled surfaces of the V-shaped notch 113 in the (111) crystallographic planes. Etchants capable of forming V-shaped grooves include potassium hydroxide, as is well known in the art. The depth of notch 113 can be any suitable depth for accommodating the optical fiber 130, and preferably ranges from about 50 microns to about 500 microns.

Recess 118 is optionally formed in the substrate. Likewise, a pocket 117 can be formed in which to mount a lens 117 for refracting the light beam traveling between the optical fiber 130 and the optical semiconductor component 140.

Figure 2:
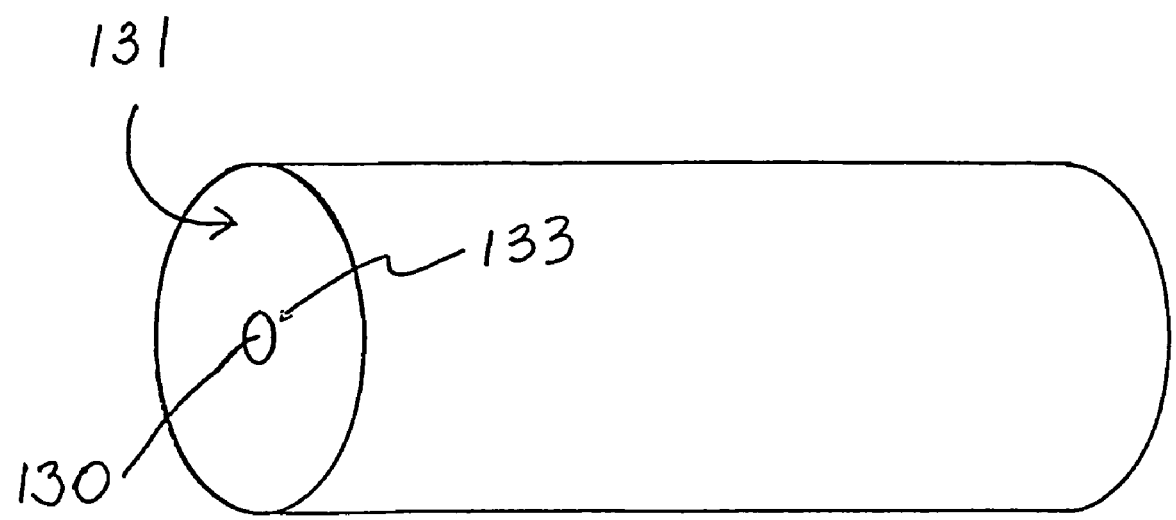
FIG. 2 is a perspective view of an optical fiber disposed within a ferrule.

Optical fiber 130 is positioned in distal section 113B of the notch and can be any conventional optical fiber typically from about 1 mm to about 5 mm in length, although lengths outside of this range can also be employed when suitable. Optical fiber 130 typically has a diameter of about 125 microns (standard). However, larger or smaller diameters can also be used when suitable. Alternatively, as shown in FIG. 2, the optical fiber 130 can be disposed through an axial bore 133 in a ferrule 131, the ferrule 131 being disposed in proximal portion 113B of the notch 113. Ferrule 131 is typically fabricated from ceramic or glass and generally can be from about 1 mm to 3 mm in diameter, although other diameters outside of this range can also be used.

The optical semiconductor component 140 is preferably mounted on the upper surface 116 of the substrate and can be any suitable semiconductor device for emitting or receiving light such as, for example, a laser diode, light emitting diode (LED), or a photodetector. Such optical semiconductor devices are well known in the art.

Lid 150 is can be fabricated from any suitable material such as silicon, glass, ceramic, metal, and the like. Lid 150 includes a recess 154 and a notch 153 for engaging an upper portion of the optical fiber 130. Lid 150 can be mounted to the upper surface 116 of the substrate by means of a bonding agent such as adhesives such as epoxy resin, benzocyclobutene resin (BCB), or soldering agents such as solder metal or solder glass frit, and at least partially defines an interior space in which the optical semiconductor component 140 and lens 160 are enclosed.

Solder glass frit is a low melting point glass such as borate glass, lead zinc borate glass, and the like. Generally, solder glass frit can have a melting point of from about 300° C. to about 800° C., usually 325° C. to about 500° C. Solder glass frit suitable for use in the present invention is commercially available, for example, from Schott Glass Technologies of Duryea, Pa.

Figure 1B:
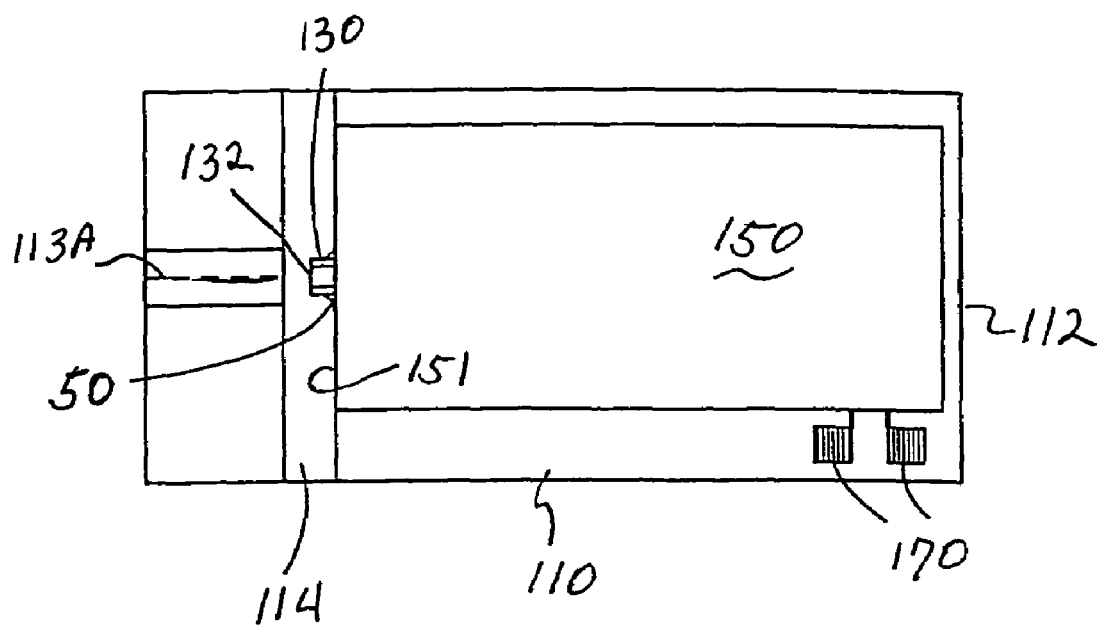
FIGS. 1B and 1C are plan views illustrating optical device packages with the optical fiber extending beyond lid.
Figure 1C:
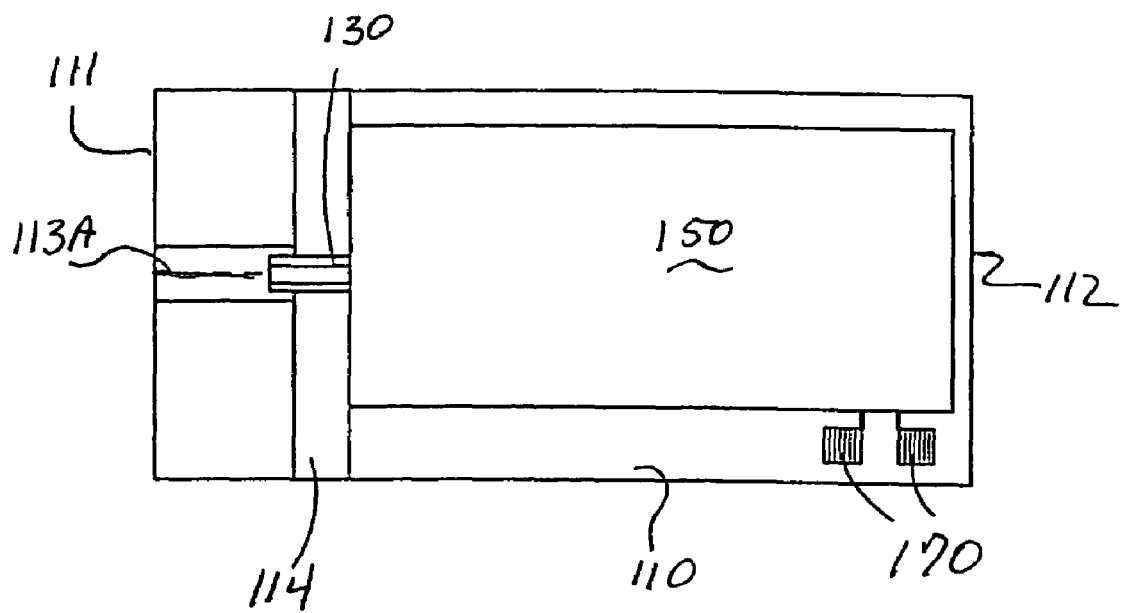

Referring now to FIG. 1B, the optical fiber 130 can extend proximally beyond the proximal end 151 of the lid and over lateral groove 114, preferably by a distance of from about 50 microns to about 400 microns. This provides the advantage that the bonding agent 50 does not wet the exposed proximal end face 132 of the optical fiber. Alternatively, as shown in FIG. 1C, the optical fiber 130 can extend into the proximal notch 113A.

Figure 3:
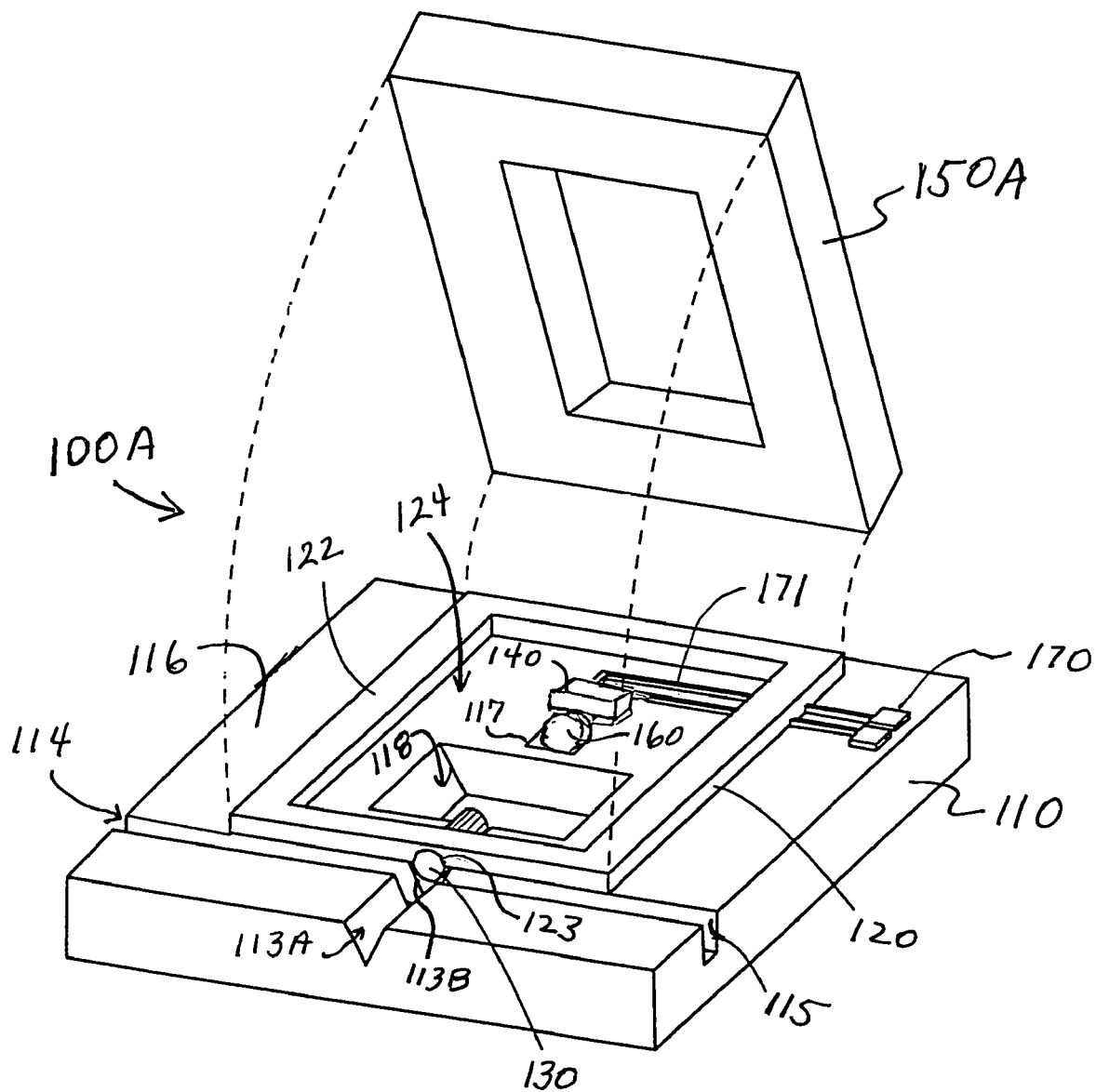
FIGS. 3 and 4 are exploded perspective views of alternative embodiments of the optical device package including a frame.

Referring briefly now to FIG. 3, optical device package 100A is similar to embodiment 100, except that a frame 120 is also employed, the frame 120 being mounted to the upper surface 116 of the substrate, and the lid 150A being mounted to the frame. Lid 150A does not require a recess to accommodate optical fiber 130 since this function is accomplished by the frame 120.

Frame 120 is preferably a single piece band-like shaped member defining an opening 124, and having a top surface 122 and a recess 123 configured and dimensioned to accommodate optical fiber 130. Frame 120 is an intermediate support structure preferably fabricated from a ceramic, glass, silicon, metal or other suitable material which does not plastically deform at the temperatures used to process and fabricate the present optical device package. Frame 120 can be of any suitable dimensions and is preferably has a thickness D (see FIG. 6) ranging from about 100 microns to about 5 mm.

Frame 120 is fixedly bonded to the upper surface 116 of the substrate such that the optical semiconductor device 140 and at least a portion of the optical fiber 130 are at least partially disposed within the opening of the band-shaped frame 120.

Bonding of frame 120 to substrate 110 can be achieved by any suitable means such as soldering with metal, bonding with solder glass frit or BCB or epoxy resins, etc. Upper surface 122 of frame 120 can be metallized or roughened, if necessary, to facilitate soldering or bonding of the lid thereto.

Figure 4:
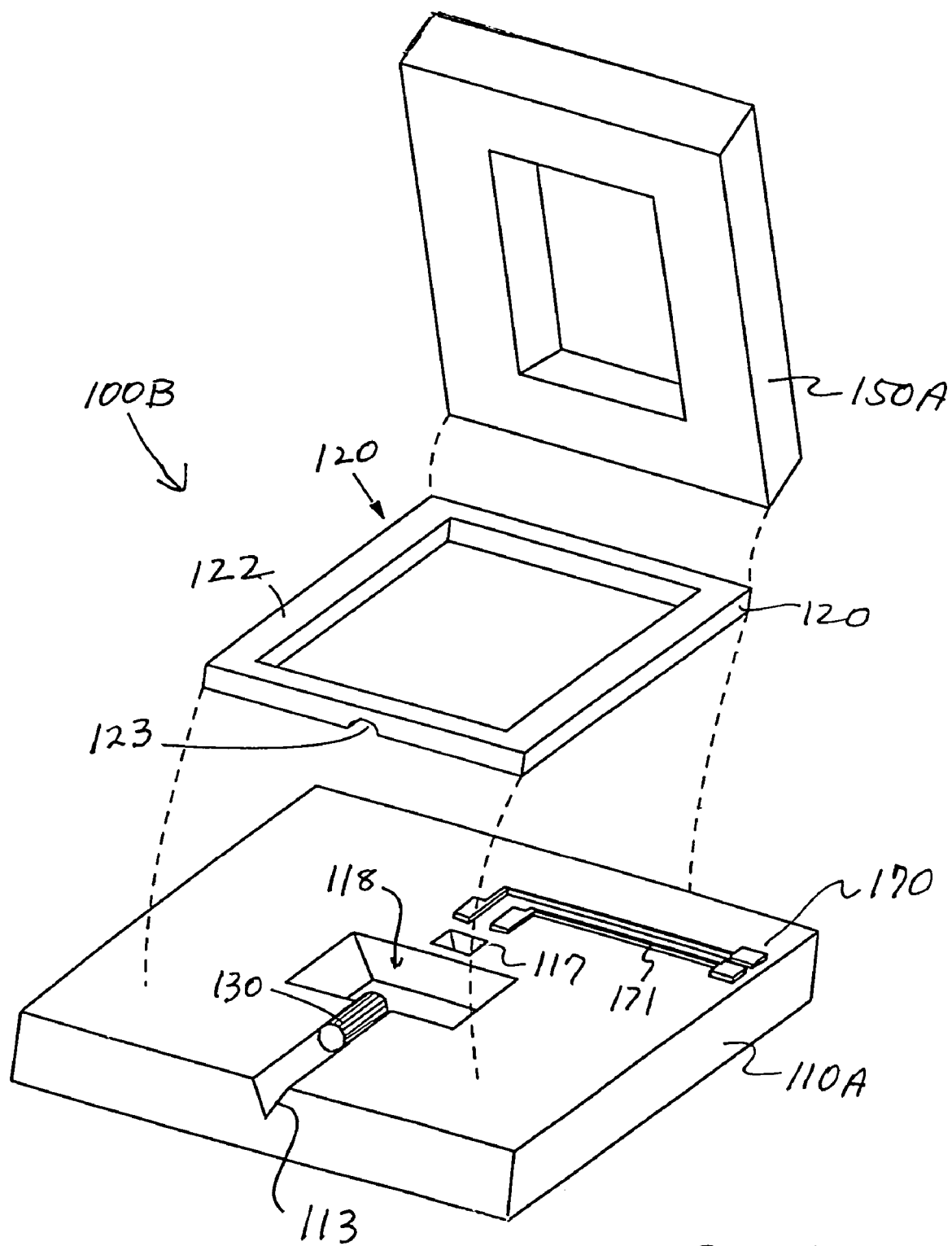

Referring to FIG. 4, optical device package 100B is similar to optical device package 100A except that the substrate 110A, unlike substrate 110, does not include a lateral groove equivalent to groove 114 in FIG. 3.

Figure 5:
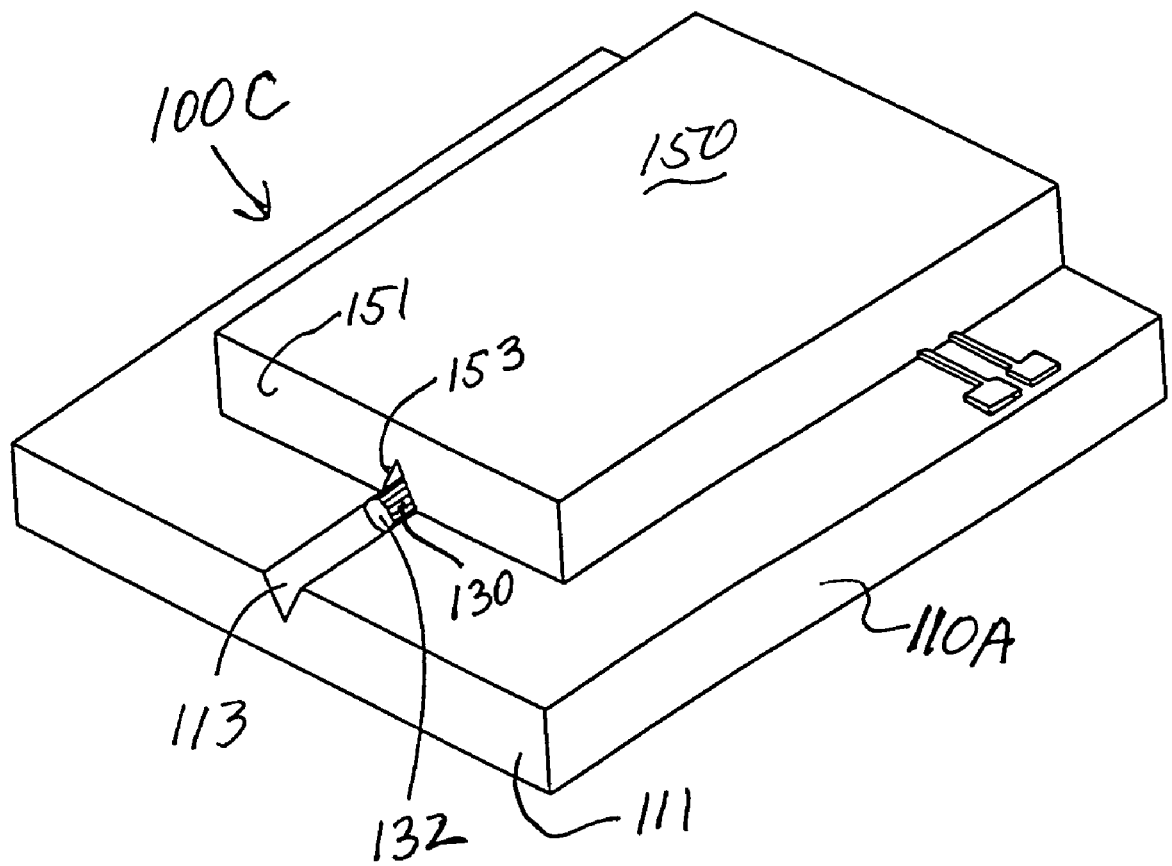
FIG. 5 is a perspective view showing an alternative embodiment of the optical device package with an extended optical fiber and extended substrate.

Referring to FIG. 5, optical device package 100C is similar to optical device package 100 shown in FIG. 1A, except that substrate 110A, unlike substrate 110, does not include a lateral groove equivalent to groove 114. The proximal end of notch 113 is coterminous with the proximal end 111 of the substrate. The proximal end 111 of the substrate extends proximally beyond the proximal end 151 of the lid. Moreover, proximal end 132 of the optical fiber 130 extends proximally beyond the proximal end 151 of the lid by a distance of, for example, about 50 microns to about 500 microns, but is distally spaced apart from the proximal end 111 of the substrate.

Figure 6:
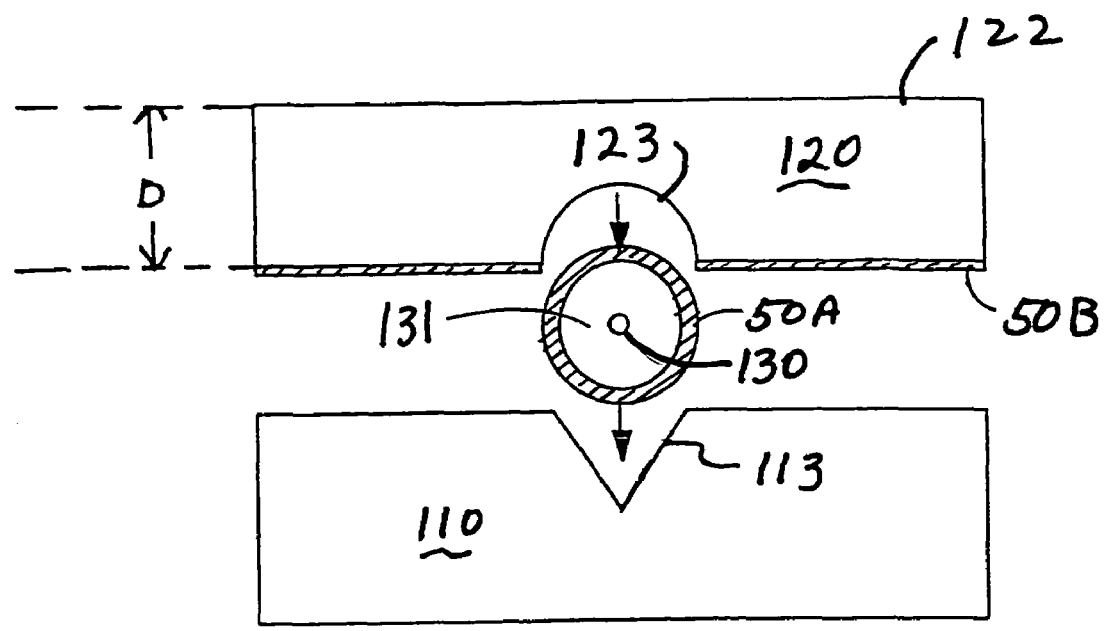
FIGS. 6 and 7A and 7B are front elevational views illustrating the assembly of the optical device package.
Figure 7A:
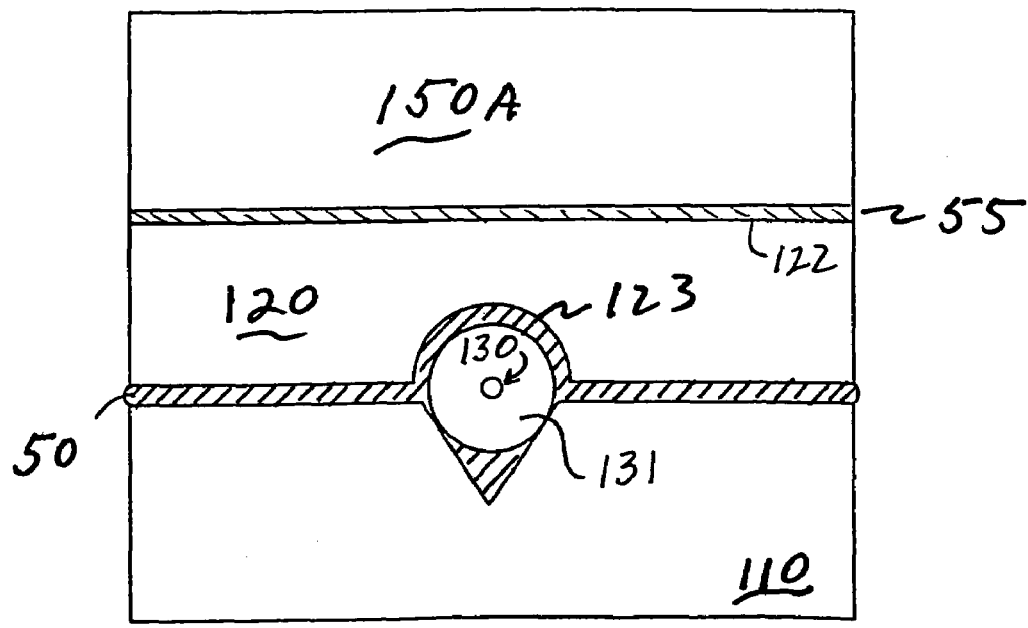

Referring now to FIGS. 6 and 7A, a method for assembly of the optical device package such as embodiment 100A is illustrated. A substrate 110 is provided with a V-shaped notch 113 configured and dimensioned to accommodate an optical fiber 130 (with or without ferrule 131). In one embodiment, the exterior surface of the ferrule 131 is coated with a layer of bonding agent such as solder glass 50A. While the embodiment is described herein with reference to solder glass, it should be recognized that any suitable bond agent (examples given above) can be used instead of solder glass. Alternatively, the substrate and/or notch 113 can be coated with solder glass. The frame 120 includes a recess 123 for accommodating the ferrule 131 with the optical fiber. Recess 123 can be of any suitable shape such as, e.g., hemispherical, V-shaped, U-shaped, rectangular, and the like. The bottom surface of the frame 120 (or the upper surface of the substrate 110) is coated with a layer 50B of solder glass. The optical fiber 130 (with or without ferrule 131) is positioned within the V-shaped notch 113 and the frame is mounted to the substrate. Then the assembled frame 120, optical fiber 130 (and optionally ferrule 131), and substrate 110 are heated to a temperature sufficient to fuse the solder glass, thereby fixedly bonding the frame 120 to the substrate 110 by means of a layer 50 of fused solder glass, as shown in FIG. 7A. Also, layer 50 of fused solder glass fixedly secures the optical fiber 130 or ferrule 131 within V-shaped notch 113 and recess 123. The optical semiconductor component or other internal components can then be mounted to the substrate 110 through the opening 124 of the frame (not shown). Thereafter, a lid 150A can be bonded to the upper surface of frame 120 by means of bonding agent 55, which can be an adhesive, such as epoxy, or other bonding agent, including solder glass, which is capable of being cured, activated or fused at a temperature lower than that required for the step of securing the frame 120 to the substrate 110.

Figure 7B:
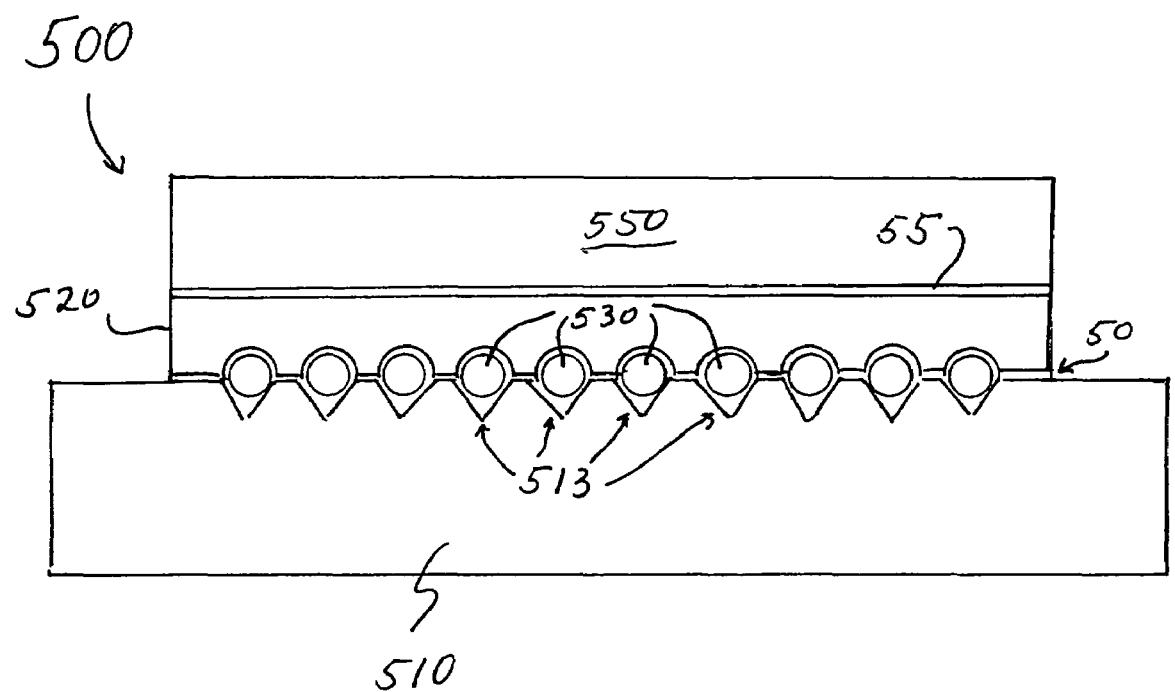

FIG. 7B illustrates an optical device package 500 having a substrate 510, frame 520, and lid 550. A layer of bonding agent 50 is disposed between the frame 520 and the substrate 510. A layer of bonding agent 55 is disposed between the lid 550 and the frame 520. Optical device package 500 is similar to that illustrated in FIG. 7A except that multiple parallel spaced apart optical fibers 530 are disposed in respective multiple parallel notches 513 in the substrate.

Optical semiconductor components are typically more sensitive to damage by heat than the optical fibers. Hence, use of a frame 120 permits the optical fiber 130 to be secured at a relatively high temperature and the optical semiconductor component 140 to be subsequently secured to the substrate at a relatively lower temperature.

Referring again to FIG. 1A and 3, bonding pads 170 are disposed around the peripheral portion of the upper surface 116 of the substrate not covered by lid 150. At least some of the bonding pads 170 are connected to the optical semiconductor component 140 by means of conductive electrical leads 171. The optical semiconductor component 140 is mounted to the ends 172 of leads 171 in the interior of the optical device package. Leads 171 extend under the lid 150 to the respective bonding pads 170. Leads 171 are generally no thicker than the layer of the bonding agent (solder glass, adhesive, etc.) which secures the lid to the substrate. Alternatively, the frame 120 can have recesses to accommodate the leads 171.

Figure 8:
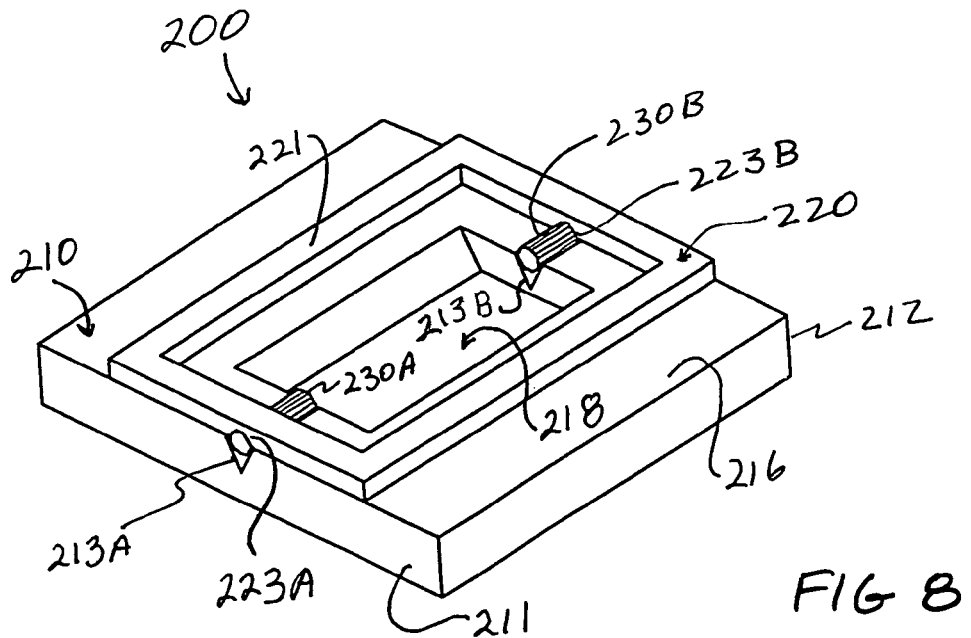
FIGS. 8, 9 and 10 are perspective views showing an optical device package having optical fibers at opposite ends of the package.

Referring now to FIG. 8, an optical device package for passive optical components and optical components requiring two ports is illustrated wherein substrate 210 includes an upper surface 216, a recessed area 218, a proximal end 211 and a distal end 212. Substrate 210 further includes a proximal V-shaped notch 213A and a distal V-shaped notch 213B. A first optical fiber stub 230A (optionally disposed through a ferrule) is positioned in V-shaped notch 213A. A second optical fiber stub 230B (also optionally disposed through a ferrule) is positioned in V-shaped notch 213B. A frame 220 is fixedly mounted to the upper surface 216 of the substrate, e.g., by solder glass, epoxy resin, or other suitable bonding agent. Frame 220 is preferably a single piece member having a band like structure which surrounds an opening, and proximal and distal recesses 223A and 223B, respectively, to accommodate the optical fibers 230A and 230B, respectively. The first and second optical fiber stubs may optionally be co-linear or not co-linear. Optionally, various optical devices such as lenses, filters, modulators, etc., can be positioned in the recessed area 218 of the substrate between the distal end of first optical fiber stub 230A and the proximal end of second optical fiber stub 230B. A lid (not shown) can optionally be fixedly mounted to the upper surface 221 of the frame. The proximal and distal ends of the optical fibers 230A and 230B, respectively, are flush with the proximal and distal ends, 211 and 212, respectively, of the substrate.

Figure 9:
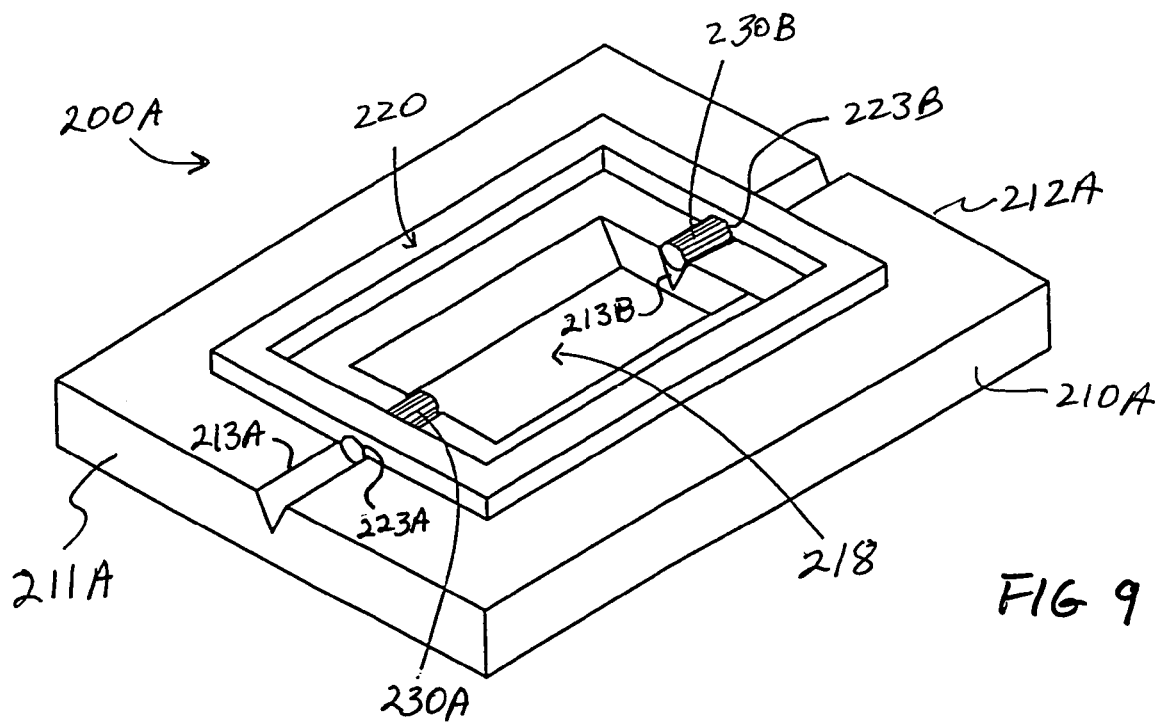

Referring to FIG. 9, in another embodiment 200A of the optical device package, the substrate 210A has a proximal end 211A which extends proximally beyond the proximal end of the frame, and a distal end 212A which extends distally beyond the distal end of the frame.

Figure 10:
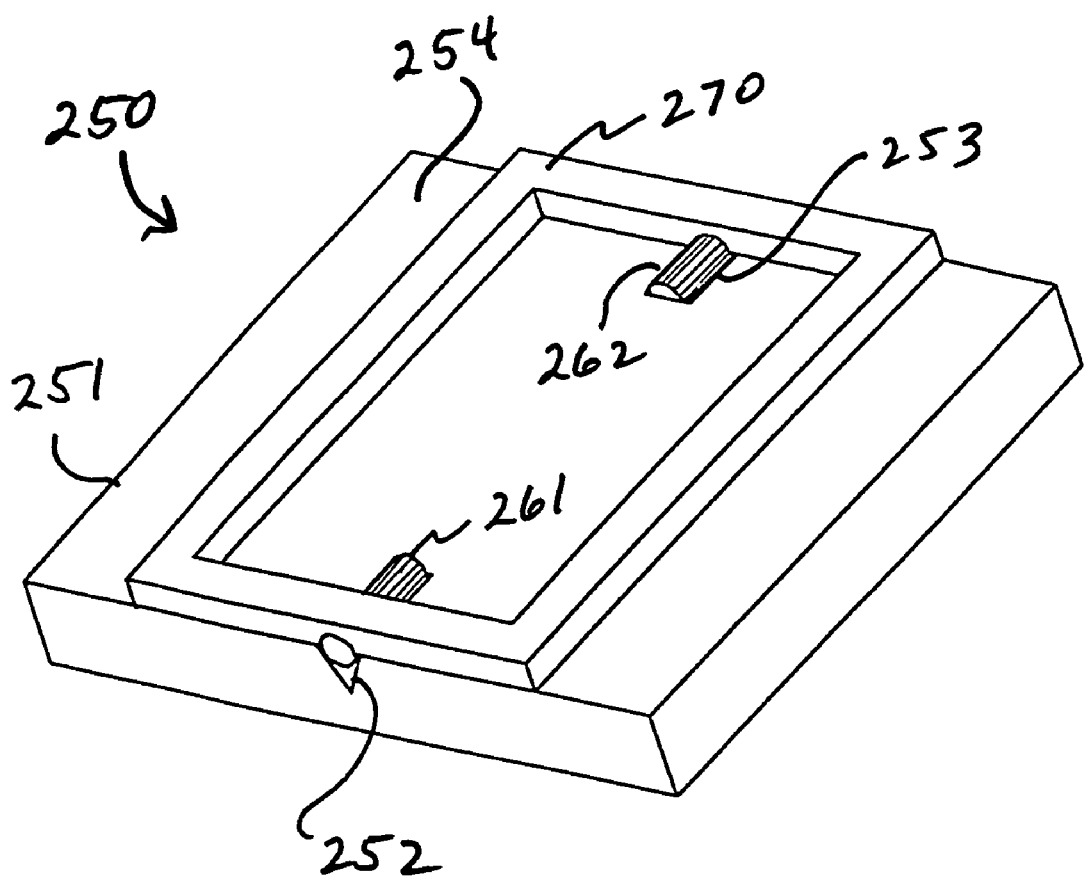

Referring to FIG. 10, in yet another embodiment 250 of the optical device package, substrate 251 has a flat upper surface 254 without any recess corresponding to, e.g., recess 218 of FIGS. 8 and 9. Optical fibers 261 and 262 are positioned respectively in notches 252 and 253. The optical axes of optical fibers 261 and 262 are above the level of the upper surface 254 by any suitable distance, typically 5 microns to about 30 microns. Optical semiconductors, or other optical components, can be mounted to the upper surface 254 within the area bounded by frame 270.

Figure 11:
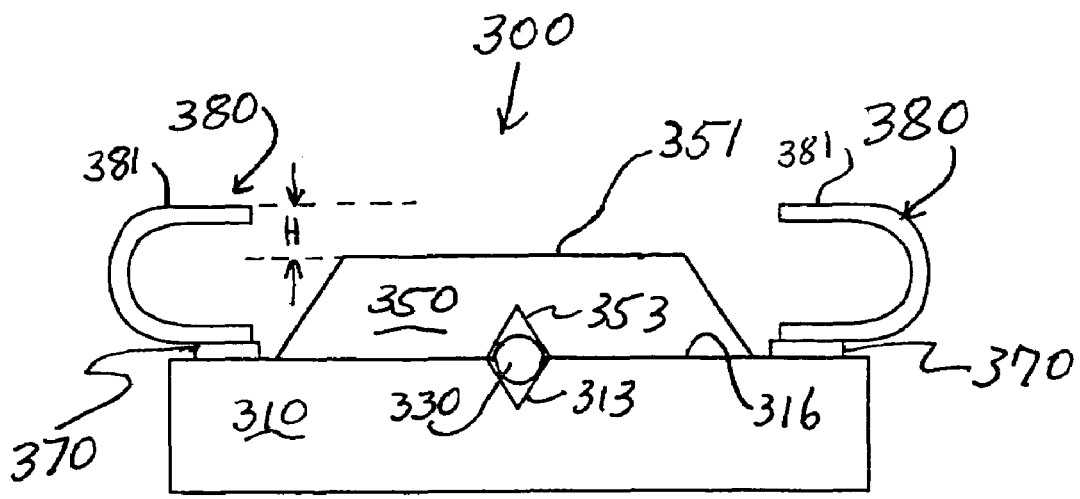
FIG. 11 is a front elevational view of an optical device package for flip mounting to a substrate.
Figure 12:
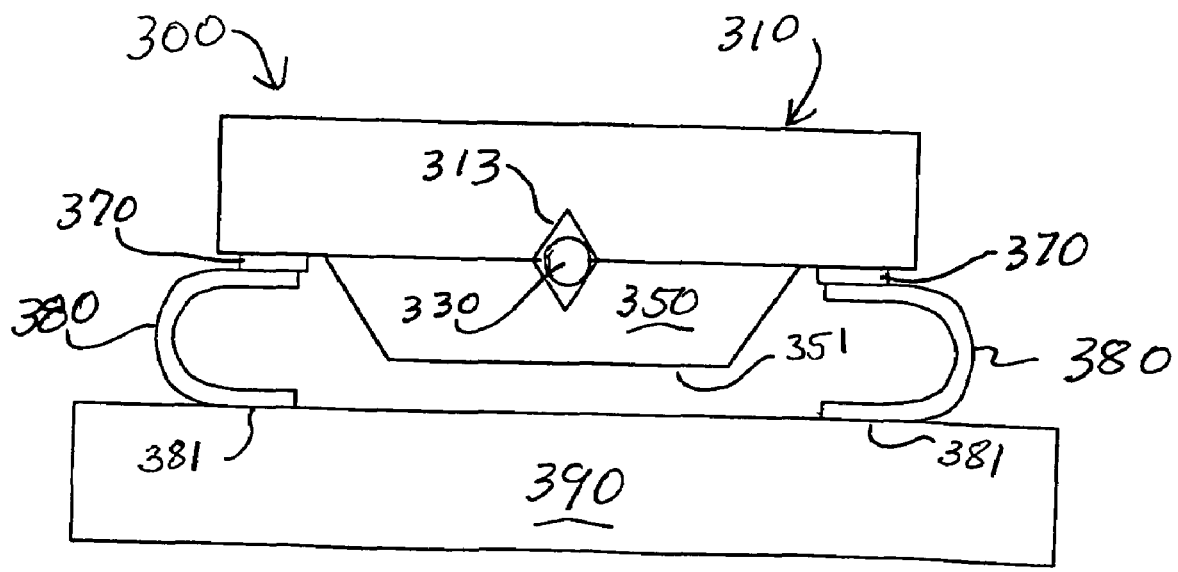
FIG. 12 is a front elevational view showing the optical device package of FIG. 11 mounted to a substrate.

Referring now to FIG. 11, an optical device package 300 includes a substrate 310 having a notch 313 for the reception of optical fiber 330. Lid 350 is mounted to the substrate 310 and at least partially defines an interior space for enclosing various optical components such as optical semiconductor components, lenses, and the like. Bonding pads 370 are disposed along the peripheral portion of the upper surface of the substrate which is not covered by the lid 350. Legs 380 are secured to respective bonding pads 370. Legs 380 are preferably U-shaped strips of conductive metal which provide flip mounting ability for the optical device package 300. To facilitate flip mounting of the optical device package 300, the top surface 381 of each leg 380 is preferably at a level higher than the level of the top surface 351 of the lid 350 by a distance H, wherein H can be any suitable distance. Preferably, H can range from about 25 microns to about 300 microns, more preferably from about 50 microns to about 200 microns. Generally, the top surface 381 of the legs can be from about 250 microns to about 1,000 microns above the upper surface 316 of the substrate 310. Preferably, legs 380 are fabricated from a resilient metal so as to function as springs. The optical semiconductor component is electrically connected to legs 380 by means of electrical leads, in a manner similar to the optical device package illustrated in FIGS. 1A and 3. The electrically conductive leads extend from the bonding pads 370 to the optical semiconductor component. The electrical leads include thin films of conductive metal which are preferably no thicker than the layer of bonding agent (solder glass, epoxy resin, etc.) by which the lid 350 is bonded to the substrate 310. When optical device package 300 is inverted as shown in FIG. 12 and flip mounted to a circuit board 390 or other such platform, legs 380 are contacted with corresponding electrical contacts (not shown) for incorporation into an electric circuit.

Figure 13:
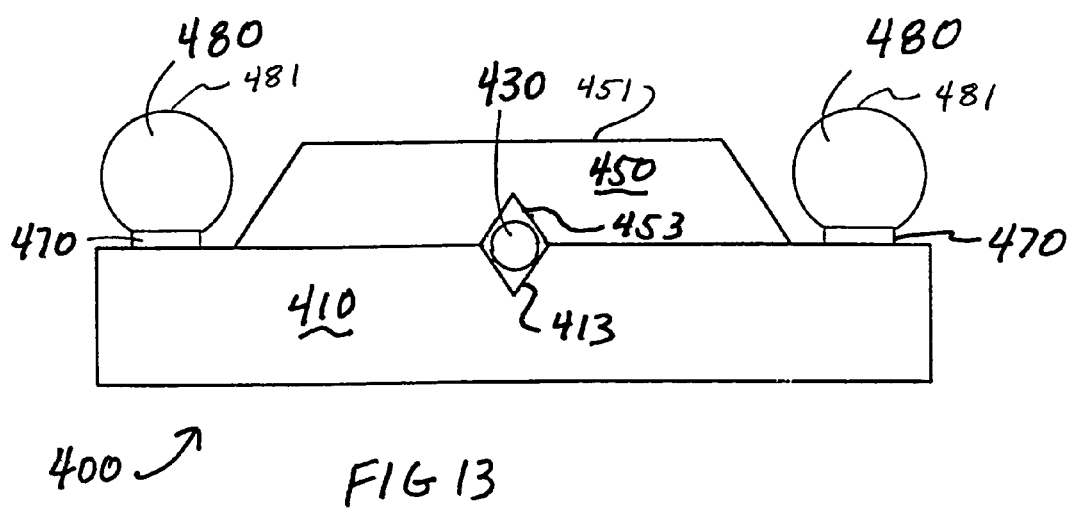
FIG. 13 is a front elevational view of an alternative embodiment of a optical device package for flip mounting to a substrate; and, FIG. 14 is a front elevational view of the optical device package of FIG. 13 mounted to a substrate.
Figure 14:
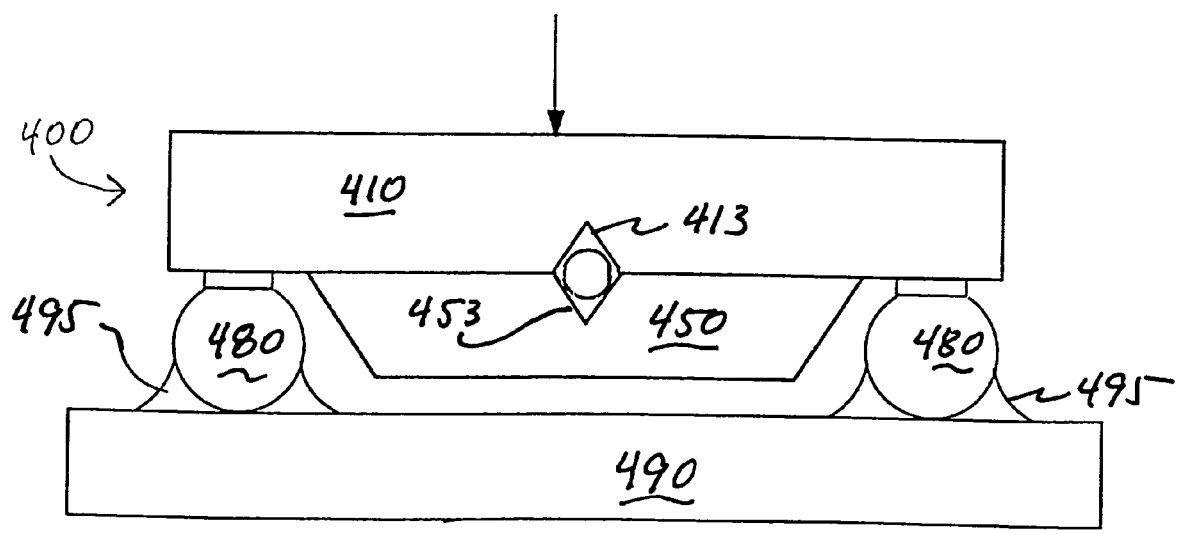

Referring now to FIG. 13, an optical device package 400 includes a substrate 410 having a notch 413 for the reception of optical fiber 430. Lid 450 is mounted to the substrate 410 and at least partially defines an interior space for enclosing various optical components such as optical semiconductor components, lenses, and the like. Bonding pads 470 are disposed along the peripheral portion of the upper surface of the substrate which is not covered by the lid 450. Conductive metal legs 480 are secured to respective bonding pads 370. The metal legs 480 can be electroformed or stamped copper or other metals such as gold, tin, silver, solder metal, and the like. The metal legs 480 are shown in FIG. 9 as spheres. However, they can alternatively be cylindrical or of other shapes. Preferably, the top surface 481 of each leg 480 is higher than the top surface 451 of the lid to facilitate flip mounting of the optical device package 400 as discussed below. Typically, the legs 480 can range in height of from about 250 microns to about 1,000 microns, although dimensions outside of this range can also be used when appropriate. The optical semiconductor component is electrically connected to legs 480 by means of electrical leads, in a manner similar to the optical device package illustrated in FIGS. 1A and 3. When optical device package 400 is inverted as shown in FIG. 14 and flip mounted to a platform such as circuit board 490, legs 480 are contacted with corresponding electrical contacts (not shown) for incorporation into an electric circuit.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. An optical device package comprising:
   a) a substrate having an upper surface, a distal end, a proximal end, and at least one longitudinally extending notch;
   b) a frame mounted to the substrate the frame including a band-like member surrounding an open area and having at least one recessed portion; and,
   c) at least one optical fiber positioned within the at least one longitudinally extending notch and disposed through the recessed portion of the frame.

2. The optical device package of claim 1 wherein the at least one longitudinally extending notch comprises distal and proximal longitudinally extending notches.

3. The optical device package of claim 2 further comprising an optical semiconductor component mounted to the substrate.

4. The optical device package of claim 3 further comprising a lid mounted to the frame for enclosing the optical semiconductor component in an interior space.

5. The optical device package of claim 3 further comprising one or more optical device selected from the group consisting of a lens, filter and modulator, the optical device being mounted to the substrate.

6. The optical device package of claim 5 wherein the optical device is positioned between a distal end of the optical fiber and the optical semiconductor component.

7. The optical device package of claim 2 wherein the distal longitudinally extending notch and the proximal longitudinally extending notch are separated from each other by a lateral groove in the substrate, wherein the optical fiber is positioned within the distal longitudinally extending notch, wherein the substrate includes a recess in the upper surface, and wherein both the distal longitudinally extending notch and the proximal longitudinally extending notch are proximal to the recess in the upper surface of the substrate.

8. The optical device package of claim 2 wherein the substrate comprises a recess in the upper surface, the distal longitudinally extending notch being distal to the recess and the proximal longitudinally extending notch being proximal to the recess.

9. The optical device package of claim 8 wherein the at least one optical fiber comprises a proximal optical fiber positioned within the proximal longitudinally extending notch and a distal optical fiber is positioned within the distal longitudinally extending notch.

10. The optical device package of claim 9 wherein the proximal optical fiber has a proximal end which is flush with the proximal end of the substrate.

11. The optical device package of claim 10 wherein the distal optical fiber has a distal end which is flush with the distal end of the substrate.

12. The optical device package of claim 1 further comprising a ferrule having a bore through which the optical fiber is disposed, the ferrule being positioned between the frame and the substrate.

13. The optical device package of claim 1 further comprising a plurality of bonding pads disposed on the upper surface of the substrate.

14. The optical device package of claim 1 comprising a plurality of parallel spaced apart optical fibers disposed within corresponding parallel spaced apart longitudinally extending notches.

15. An optical device package comprising:
   a) a substrate having an upper surface, a distal end, and a proximal end, and at least a first longitudinally extending notch having a proximal end caterminous with the proximal end of the substrate;

b) at least one longitudinally oriented optical fiber mounted to the substrate and having a proximal end spaced apart from, and distal to, the proximal end of the notch; and c) a frame comprising a band-like member defining an opening, the frame circumscribing the opening and being mounted to the substrate, the opening exposing the upper surface of the substrate.

16. The optical device package of claim 15 wherein the frame has at least one recessed portion.

17. The optical device package of claim 16 further comprising a lid for enclosing the optical semiconductor component in an interior space, the lid being mounted to an upper surface of the frame.

18. The optical device package of claim 17 wherein the lid has a proximal end which is distal to the proximal end of the optical fiber.

19. The optical device package of claim 15 further comprising an optical semiconductor component mounted to the substrate.

20. The optical device package of claim 15 wherein the substrate comprises a second longitudinally extending notch co-linear with and distal to the first longitudinally extending notch, wherein the first and second longitudinally extending notches are separated by a groove extending laterally across the substrate, and wherein the proximal end of the optical fiber extends over the lateral groove.

21. The optical device package of claim 15 wherein the opening extends through the frame.

22. An optical device package comprising:

a) a substrate having an upper surface, a distal end, and a proximal end, and at least a first longitudinally extending notch having a proximal end coterminous with the proximal end of the substrate;

b) at least one longitudinally oriented optical fiber mounted to the substrate and having a proximal end spaced apart from, and distal to, the proximal end of the notch;

c) an optical semiconductor component mounted to the substrate; and d) a lid for enclosing the optical semiconductor component in an interior space, the lid being mounted to the upper surface of the substrate.

* * * * *